(12) United States Patent
Leonard (10) Patent No.: US 9,778,965 B1
(45) Date of Patent: *Oct. 3, 2017

(54) AUTOMATIC QUEUE SIZE DETERMINATION AND TUNING

(71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/875,263

(22) Filed: Oct. 5, 2015

Related U.S. Application Data

(63) Continuation of application No. 14/145,064, filed on Dec. 31, 2013, now Pat. No. 9,201,716.

(51) Int. Cl.
*G06F 9/54* (2006.01)

(52) U.S. Cl.
CPC .................................. *G06F 9/546* (2013.01)

(58) Field of Classification Search
None
See application file for complete search history.

(56) References Cited

U.S. PATENT DOCUMENTS

| 4,890,318 A | 12/1989 | Crane et al. |
| 5,167,033 A * | 11/1992 | Bryant ............... H04L 47/10 370/235 |
| 5,499,374 A | 3/1996 | Di Giulio et al. |
| 6,522,635 B1 | 2/2003 | Bedwell |
| 6,615,383 B1 | 9/2003 | Talluri et al. |
| 6,711,137 B1 | 3/2004 | Klassen et al. |
| 7,716,525 B1 | 5/2010 | Buchko et al. |
| 7,934,028 B1 | 4/2011 | Leonard et al. |
| 2005/0018611 A1 * | 1/2005 | Chan ..................... H04L 41/147 370/241 |
| 2005/0223163 A1 * | 10/2005 | Ogasawara ........... G06F 3/0613 711/112 |
| 2013/0198302 A1 | 8/2013 | Kinoshita et al. |

OTHER PUBLICATIONS

First Action Interview Preinterview Communication dated May 14, 2015 in U.S. Appl. No. 14/145,064, 6 pages.
Notice of Allowance dated Jul. 30, 2015 in U.S. Appl. No. 14/145,064, 15 pages.

* cited by examiner

*Primary Examiner* — Tuan Dao (57) ABSTRACT

Methods, systems, and media are provided for automatically determining a preferred queue size for an individual queue based on message traffic. Embodiments include referencing a plurality of queue data sets for one queue. One or more high-activity queue data sets are identified as having a large number of messages compared to other queue data sets in the plurality. Thereafter, a target size for a queue is determined based on an average message size generated using one or more of the high-activity queue data sets. The current size of the queue is adjusted to reflect the target size. In further aspects, the queue data sets may be collected over time intervals that are dynamically modified based on message traffic.

20 Claims, 3 Drawing Sheets

AUTOMATIC QUEUE SIZE DETERMINATION AND TUNING

CROSS-REFERENCE TO RELATED APPLICATIONS

This application is a continuation of U.S. Pat. No. 9,201,716, filed Dec. 31, 2013, having issued on Dec. 1, 2015, and titled "Automatic Queue Size Determination and Tuning," the disclosure of which is incorporated by reference herein in its entirety.

SUMMARY

A high-level overview of various aspects of the invention are provided here for that reason, to provide an overview of the disclosure and to introduce a selection of concepts that are further described in the detailed description section below. This summary is not intended to identify key features or essential features of the claimed subject matter, nor is it intended to be used as an aid in isolation to determine the scope of the claimed subject matter. In brief and at a high level, this disclosure describes, among other things, ways to determine target-queue sizes and tune individual queues in accordance with the target-queue sizes for improved message throughput, for example, in a middleware environment.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention provide systems, methods, and computer-readable media for tuning a queue by determining and implementing a target-queue size based on message volume. Within a middleware environment, each individual queue is associated with a buffer for holding messages. A buffer operates as storage for the messages being transferred from one application to another, i.e., messages within a queue are buffered until the destination application makes a request. Queues may operate on a first-in-first-out (FIFO) basis, a last-in-first-out (LIFO) basis, a round-robin basis, or other basis known in the art. Queues store the messages in transit unless or until capacity is reached. At such a point, messages may be "dropped" from the queue/buffer, known as tail drop. Conversely, queue/buffer underrun occurs when messages leave a queue/buffer at a faster rate than they arrive. The size of a queue/buffer may be preset, or it may be ratcheted up or down to accommodate message traffic in a queue or buffer. The act of ratcheting up or down the queue/buffer size "tunes" the corresponding queue and/or buffer. In this regard, tuning a buffer size or queue size refers to increasing or decreasing a size of a buffer or queue. Although queue size and queue tuning are generally used herein, size and/or tuning can be interchangeably used with reference to a buffer or other storage associated with a queue.

Using embodiments presented herein to tune individual queues (or buffers associated therewith), message transport in a messaging-oriented-middleware (MOM) environment may be improved and tail drop may be reduced. To efficiently and effectively manage message capacity of a queue (e.g., to reduce a taildrop), the message capacity of a queue may be automatically determined based on the message volume through the queue (target-queue size), e.g., the number of messages being transported through the queue. Stated differently, a target-queue size may be determined based on previous message volumes associated with the queue or associated buffer. Thereafter, the target-queue size can be implemented by tuning or adjusting the size of the queue to optimize the queue performance. Performance of each individual queue within a MOM environment can be separately managed and adjusted according to embodiments of the present invention. Although the invention described herein is generally referenced in a MOM environment, as can be appreciated, aspects of the invention can be implemented in any environment in which data is stored in association with queues or buffers.

In one aspect, the present invention is directed to one or more computer-readable media having computer-executable instructions embodied thereon that, when executed, perform a method for tuning a queue by referencing a plurality of queue data sets, wherein each of the plurality of data sets corresponds to messages associated with a queue within a collection time period. The method further includes identifying a queue data set associated with a largest number of messages in the queue from within the plurality of queue data sets. The method also includes determining a target-queue size using queue data associated with the largest number of messages in the queue.

In another aspect, embodiments of the present invention are directed to one or more computer-readable media having computer-executable instructions embodied thereon that, when executed, perform a method for tuning a queue by referencing a plurality of queue data reports, wherein each of the queue data reports includes queue data associated with a different time period for a queue. The method includes selecting a queue data report from among the plurality of queue data reports having a highest volume of queue messages within the different time periods. An average message size for the queue is determined using queue data within the selected queue data report corresponding with the highest volume of queue messages, and a target-queue size is determined based upon the average message size for the queue. Thereafter, the size of the queue is adjusted based on the determined target-queue size.

In yet another aspect, a system for tuning a queue by determining and implementing a target-queue size based on message throughput is provided. The system includes a queue manager component configured to reference a plurality of queue reports, wherein each of the plurality of queue reports reflects data pertaining to transport of messages in and out of an individual queue during a time interval. The queue manager is also configured to identify a queue report indicating a highest number of messages within the individual queue from among the plurality of queue reports. The queue manager is further configured to determine a target-queue size based on queue data corresponding with the queue report indicating the highest number of messages within the individual queue.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CDMA Code Division Multiple Access
CD-ROM Compact Disk Read-only Memory
DSL Digital Subscriber Line
DVD Digital Versatile Discs
EEPROM Electronically Erasable Programmable Read-only Memory
FIFO First-In First-Out
GPRS General Packet Radio Service
GSM Global System for Mobile Communications
LAN Local Area Network
LED Light Emitting Diode
LIFO Last-In-Last-Out
LTE Long Term Evolution
MOM Message Oriented Middleware
RAM Random Access Memory
ROM Read-only Memory
SAN Storage Area Network
TDMA Time Division Multiple Access
USB Universal Serial Bus
WAN Wide Area Network Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, DVD, holographic media or other optical disc storage, magnetic cassettes, magnetic tape, magnetic disk storage, and other magnetic storage devices. These technologies can store data momentarily, temporarily, or permanently.

Figure 1:
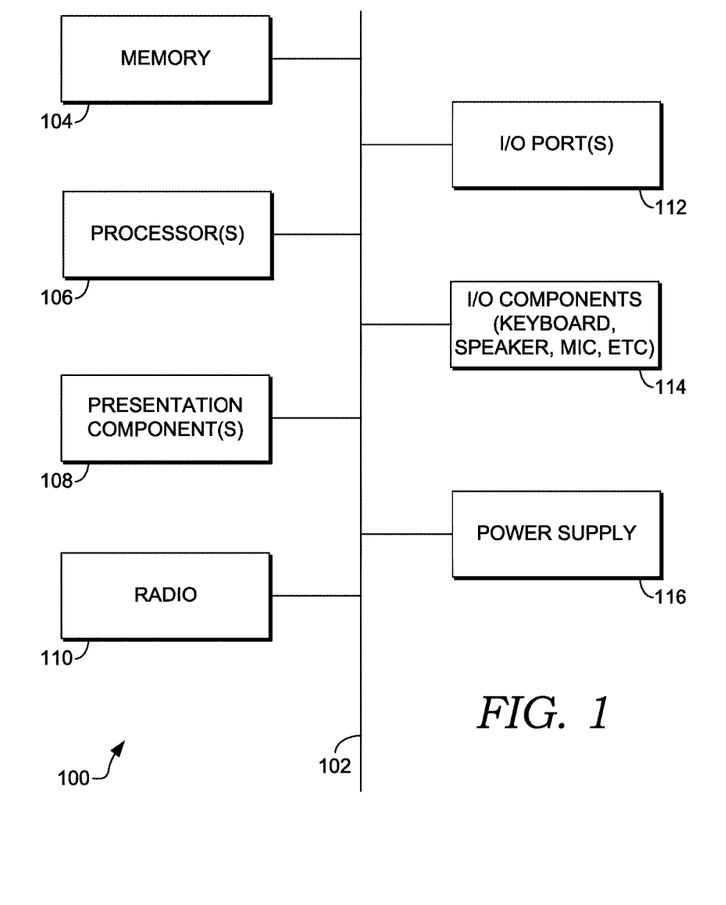
FIG. 1 depicts an exemplary computing-system architecture according to embodiments of the present invention.

Referring initially to FIG. 1, a block diagram shows an exemplary computing-system architecture 100 suitable for tuning a queue by determining and implementing a target-queue size based on message volume. It will be understood and appreciated by those of ordinary skill in the art that the computing-system architecture 100 shown in FIG. 1 is merely an example of one suitable computing system and is not intended to suggest any limitation as to the scope or functionality of embodiments of the invention. Neither should the computing-system architecture 100 be interpreted as having any dependency or requirement to any single component/module or combination thereof, as illustrated herein.

As illustratively shown, the computing-system architecture 100 includes a bus 102 that directly or indirectly couples various components together including memory 104, a processor 106, a presentation component 108, a radio (if applicable) 110, input/output ports 112, input/output components 114, and a power supply 116. Although some components are shown in the singular, they may be plural. For example, the computing-system architecture 100 might include multiple processors or multiple radios, etc.

Memory 104 might take the form of memory components previously described. Memory 104 can include any type of medium that is capable of storing information (e.g., a database, a buffer, SAN, a disk). Additionally, memory 104 may be local or remote, such as on a network or remote server. In one embodiment, memory 104 includes a set of embodied computer-executable instructions that, when executed, facilitate various aspects disclosed herein. These embodied instructions will variously be referred to as "instructions" or an "application" for short.

Processor 106 might actually be multiple processors that receive instructions and process them accordingly. Presentation component 108 includes the likes of a display, a speaker, as well as other components that can present information (such as a display, an LED, or even lighted keyboards).

Numeral 110 represents a radio that can facilitate communication with a wireless-telecommunications network. Illustrative wireless telecommunications technologies include CDMA, GPRS, TDMA, GSM, WiMax, LTE, and the like. Radio 110 might additionally or alternatively facilitate other types of wireless communications including Wi-Fi communications. As can be appreciated, in various embodiments, radio 110 can be configured to support multiple technologies and/or multiple radios can be utilized to support multiple technologies.

Input/output port(s) 112 might take on a variety of forms. Illustrative input/output ports 112 include a USB jack, stereo jack, infrared port, proprietary communications ports, and the like. Input/output components 114 include items such as keyboards, microphones, speakers, touch screens, and any other item usable to directly or indirectly input data into a computing device. Power supply 116 includes items such as batteries, fuel cells, or any other component that can act as a power source to the computing-system architecture 100.

As previously mentioned, embodiments of the present invention provide systems, methods and computer-readable media for tuning a queue by determining and implementing a target-queue size based on message volume. Accordingly, embodiments of the present invention allow for the determination of a target-queue size based on message volume and implementation of the target-queue size for improved message transport in a MOM environment. Performance of each individual queue within a MOM environment can be improved by tuning the queue based on the individual message volume experienced by the queue. In this regard, the queue size can be automatically determined and adjusted to accommodate the message volume associated with the corresponding queue.

Figure 2:
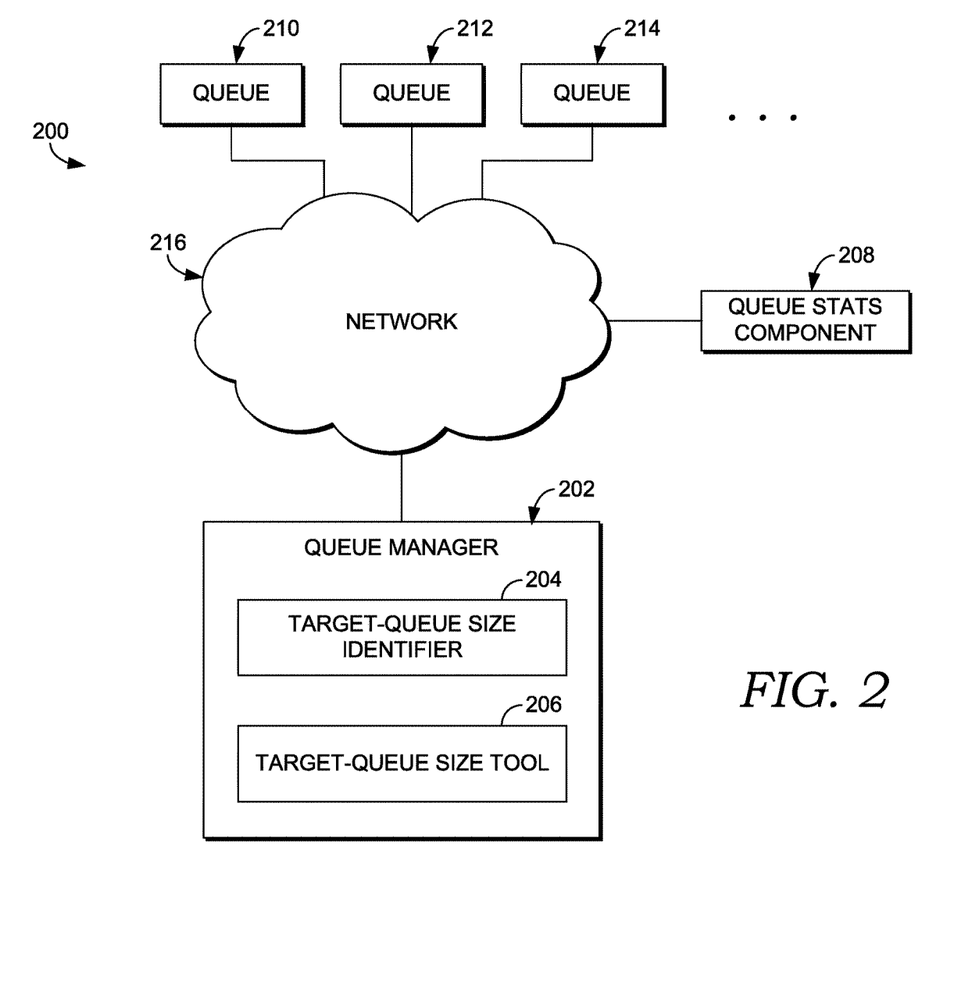
FIG. 2 illustrates a computing environment in which embodiments of the present invention may be practiced.

FIG. 2 illustrates an exemplary computing environment 200 in which components may implement the methods described herein. Embodiments of the present invention may be practiced in a networking environment where tasks are performed by remote-processing devices that are linked through a communications network. The computing environment 200 is merely one example of a suitable computing environment, and is not intended to suggest any limitation as to the scope of use or functionality of embodiments of the present invention. For example, although components are illustrated as distributed via a network, the components described herein could communicate directly with one another or could be combined to operate within a single computing device. Neither should the computing environment 200 be interpreted as having any dependency or requirement related to any single component or combination of components illustrated herein.

The computing environment 200 of FIG. 2 includes a queue manager 202, a queue stats component 208, and one or more individual queues 210, 212, 214, which may communicate with each other via a network 216. Network 216 might comprise a cable network, the Internet, a wireless network (e.g., a wireless telecommunications network), a wireline network, a local exchange carrier (LEC), landline, cable line, digital subscriber line (DSL), fiber-optic line, local area network (LAN), wide area network (WAN), metropolitan area network (MAN), or a combination thereof or portions thereof.

Queues 210, 212, and 214 are utilized for messages being transported between applications, programs, queues managers, or the like (not shown). Although three queues are illustrated, any number of queues can be used within the scope of embodiments. Further, queues can be located in any number of locations including local to or remote from queue manager 202, queue stats component 208, and/or the like.

A queue, such as queues 210, 212, and 214, includes or accesses memory (e.g., buffer), whether volatile storage or permanent storage, as described in FIG. 1. A message refers to data, such as a packet of data (or portion thereof). When a message is received (e.g., from another component not shown), it is routed to a queue, such as queue 210, 212, or 214. A message may reside in an individual queue 210, 212, or 214, for example, until the message is retrieved or transmitted (e.g., by or to a destination application, program, or queue manager). Alternatively, a message may be spilled to disk if the buffer corresponding to the queue 210, 212, or 214 reaches capacity or a tail drop may occur. The routing of messages into and out of one or more queues 210, 212, 214 may be facilitated by the queue manager 202.

The queue manager 202 generally manages queues. The queue manager 202 routes incoming messages into a queue, such as queue 210, 212, or 214. The queue manager 202 can select a queue in any number of manners. For instance, the queue manager 202 might select a queue based on a sequence/pattern, a queue with greater capacity, a queue associated with a corresponding message (e.g., based on a receiving application, etc.). In some cases, the queue manager 202 can additionally or alternatively transmit incoming messages to another queue manager such that the other queue manager can facilitate routing the message to a queue. The queue manager 202 might also route outgoing messages from queues 210, 212, 214, to an appropriate channel for departure. A single queue manager may oversee and direct message transport for any number of queues in communication with the queue manager 202 (e.g., local or remote to the queue manager). In various embodiments, the queue manager 202 may operate on a request-response basis or publish-subscribe basis. Although illustrated in FIG. 2 as a single component, the queue manager 202 may operate on any number of servers.

Queue stats component 208 is a data collection tool. In embodiments, queue stats component 208 is configurable to monitor and collect data of one or more queues, such as queues 210, 212, and 214. Examples of similar commercially available monitoring components include WebSphere MQ, Q Pasa!® by MQSoftware, Candle's PathWAI, and BMC Patrol. Queue stats component 208 may monitor one or more queues 210, 212, and 214, and collect statistical data associated with queues (i.e., queue data). Collection of the statistical data can be configured to occur periodically. Such a collection time interval may be set and/or controlled by a user. For example, a collection time interval may be a period of 60 seconds, upon expiration of which queue data can be collected. Further, queue stats component 208 may be configured to store collected queue data in queue reports. In such a case, each report might correspond to a single queue, such as queue 210, 212, or 214, and a particular time interval. By way of example, a queue 210 might have a first queue report associated with a one minute time interval and a second queue report associated with another one minute time interval, etc., and a queue 212 might have a first queue report associated with a first minute time interval and a second queue report associated with a second minute time interval, etc. In this way, queue stats component 208 may be configured to store one or more queue reports for each queue 210, 212, 214 (e.g., local or remote). Storage of the queue reports can also be configured to occur periodically, and the time interval of data collection may be set and controlled by a user.

Queue data that is collected may be any type of data associated with a queue and/or corresponding buffer. By way of example and without limitation, queue data may include a number of bytes, a number of messages sent, a number of messages received, a maximum number of messages in a queue, an average duration of time a message remains in an queue, etc. Once queue reports are created and stored, embodiments of the present invention can access this report pool and reference data regarding each queue 210, 212, and 214.

With continued reference to FIG. 2, the queue manager 202 can utilize the collected data to identify and implement target-queue sizes for the corresponding queues. In one embodiment, the queue manager 202 includes a target-queue size identifier 204 and a target-queue size tool 206. The queue manager 202 is merely one example of a suitable queue manager, and is not intended to suggest any limitation as to the scope of use or functionality of embodiments of the present invention. Neither should the queue manager 202 be interpreted as having any dependency or requirement related to any single component or combination of components illustrated herein.

The target-queue size identifier 204 is configured to identify or determine target-queue sizes associated with queues managed by the queue manager 202. As such, the target-queue size identifier 204 can reference queue reports associated with queues (or queue data contained therein). In this regard, target-queue size identifier 204 can reference (e.g., receive, obtain, retrieve, access, etc.) one or more queue reports for a particular queue, for example, from queue stats component 408. Such queue reports can reflect or summarize the transport of messages in and/or out of an individual queue during a time interval.

In embodiments, the target-queue size identifier 204 can utilize the previously recorded queue data associated with a queue, or calculations derived therefrom, to determine a target-queue size for the corresponding queue. In one example, the target-queue size identifier 204 identifies a queue report or data contained therein indicating a highest number of messages within an individual queue for a particular collection time period. For instance, assume that queue 210 is associated with a first queue report for a first minute, a second queue report for a second minute, a third queue report for a third minute, etc. Further assume the first queue report includes a greatest or highest number of messages of 100 within the first minute, the second queue report includes a greatest or highest number of messages of 110 within the second minute, and a the third queue report includes a greatest or highest number of messages of 105 within the third minute. In such a case, the target-queue size identifier 204 can select the second queue report as the second queue report contained the greatest number of messages within a collection time period.

The target-queue size identifier 204 can analyze any number of queue reports when selecting the queue report, or data associated therewith, having the greatest number of messages within a collection time period (e.g., a time period of 60 seconds). For example, in some cases, the target-queue size identifier 204 might analyze a predetermined number of collection time periods, such as 1,000. In other cases, collection time periods occurring within a predetermined analysis time period (e.g., one week) might be analyzed or collection time periods occurring since the last target-queue size identification and/or implementation might be analyzed, etc.

Upon identifying a queue report or collection time period instance having a greatest number of messages within the queue, queue data associated with the greatest number of messages within the particular queue can be used to determine a target-queue size for that queue. In one aspect, queue data associated with the greatest number of messages within a queue are used to determine an average message size for the queue. An average message size for the queue may be determined, for instance, by dividing the total number of bytes by the total number of puts during the collection time period associated with the greatest number of messages for the queue. For instance, assume that during the time interval between 2:28 p.m. and 2:29 p.m., queue 210 had a highest number of messages equal to 1200 messages, which is the largest number of messages at any one time in a one minute collection time period as compared to the other collection time periods analyzed (e.g., over a 24 hour period). The total number of bytes during that one minute collection time period from 2:28 p.m. to 2:29 p.m. can be divided by the total number of puts during that same time period to obtain an average message size (average bytes per put) for queue 210 during that one minute collection time period.

Thereafter, the average message size can be multiplied by the corresponding message depth or largest number of messages in the queue during that collection time period to identify a target-queue size for the queue. In some cases, the result of the average message size multiplied by the message depth might be converted, for example, to kilobytes to indicate the target-queue size for the queue (e.g., divide by 1024 to convert to kilobytes). Such a target-queue size is intended to prevent messages from spilling from a buffer to a disk. In other words, the target-queue size enables an optimal queue size for the corresponding queue.

As can be appreciated, other methods can be used to determine a target-queue size. For example, rather than using queue data associated with a greatest number of messages in a queue during a collection time period, queue data associated with a median number of messages in a queue during a collection time period could be used.

The target-queue size tool 206 is configured to implement the target sizes identified for corresponding queues, such as queues 210, 212, and 214. In this way, the target-queue size tool 206 can alter, adjust, or modify a queue size for a queue based upon a target-queue size determined for the queue. In various embodiments, the adjustment of the individual queue-size by the target-queue size tool 206 occurs automatically, such as, for example, when queue activity ceases, shut down or reboot of a queue manager, etc., and/or any component (e.g., queue manager) interruptions including scheduled maintenance.

In this regard, the target-queue size tool 206 can identify when to modify a queue size (e.g., upon shut-down/reboot/maintenance, etc.). Thereafter, the queue size can be modified in accordance with the identified target-queue size. Such a target-queue size might be retrieved from storage (e.g., in association with the queue) or otherwise referenced for implementation. Upon referencing a target-queue size for a queue, the target-queue size tool 206 may compare the current queue size with the target-queue size to determine an amount of which to increase or decrease the size of the queue to obtain the target-queue size. The queue size of the queue could then be adjusted in accordance with such an increase or decrease amount.

As can be appreciated, in embodiments, a user might initiate and/or prevent the modification of the queue size. For example, rather than an automatic implementation, upon shut-down of the queue manager, a user might be presented with a query as to whether to modify the queue size. In such a case, the user can select to continue with queue size modification or avoid queue size modification to the queue.

Figure 3:
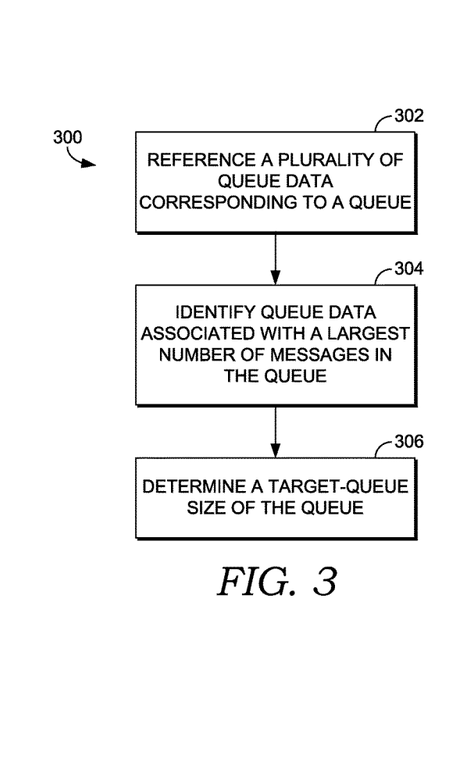
FIG. 3 is a flow diagram for computer-readable instructions that perform a method for determining a target-queue size in accordance with embodiments of the present invention.
Figure 4:
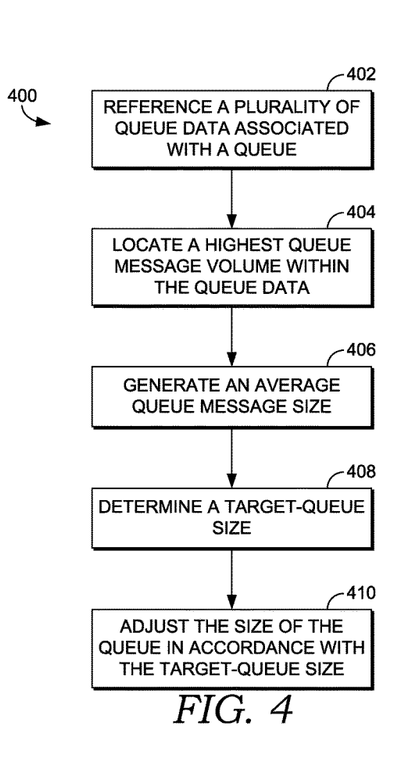
FIG. 4 provides an exemplary method for automatically determining a target-queue size and tuning individual queues, according to embodiments of the present invention.

As illustrated in FIGS. 3 and 4, exemplary methods 300 and 400 for implementing embodiments of the present invention are provided. When describing FIGS. 3 and 4, reference may also be made to FIG. 2. These exemplary methods 300 and 400 can be described in the general context of computer executable instructions. Generally, computer executable instructions can include routines, programs, objects, components, data structures, procedures, modules, functions, and the like that perform particular functions or implement particular abstract data types. The methods 300 and 400 can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods 300 and 400 are illustrated as a collection of blocks in a logical flow graph representing a sequence of operations that can be implemented in hardware, software, firmware, or a combination thereof. The order in which the methods 300 and 400 are described is not intended to be construed as a limitation, and any number of the described method blocks can be combined in any order to implement the methods, or alternate methods. Additionally, individual operations may be omitted from the methods 300 and 400 without departing from the spirit and scope of the subject matter described herein. In the context of software, the blocks represent computer instructions that, when executed by one or more processors, perform the recited operations.

By way of example only, FIG. 3 illustrates an exemplary method 300 for determining a target-queue size based on message volume. The method 300 depicted may be implemented by a queue manager (see FIG. 2) in a MOM environment. Initially, at block 302, the method 300 includes referencing a plurality of queue data corresponding with a particular queue. As previously described, such queue data can be periodically collected. Referencing the queue data may include searching for, locating, and accessing the queue data associated with the queue. The queue data may be referenced automatically, on command, or after a user initiates the action.

Such queue data can includes statistics or data regarding messages and/or data associated with the queue within the MOM environment. Each separate and individual queue operating in the MOM environment may have a corresponding plurality of queue data. As such, the method 300 may be performed on each separate and individual queue.

As previously described, queue data may include the number of puts operations (messages written), the number of gets operations (messages read), the maximum number of messages in the individual queue, the average duration of time a message remains in the individual queue, and the number of bytes within the individual queue. Queue data may also include useful and insightful statistics or data not mentioned here, but that would be known by a practitioner in the art. Such queue data can be collected regarding each queue in the MOM environment, and might be represented by in association with queue reports corresponding to each collection time period.

The queue data may be organized in sets (e.g., queue reports), with each set including queue statistics or data corresponding to activity within the individual queue occurring during a particular time interval. For instance, a queue report might include statistics or data representing the queue activity within a particular sixty-second period of time. Therefore, a plurality of queue reports may represent a host of separate and distinct sixty-second time intervals. The queue reports of an individual queue may ultimately contain queue data corresponding to particular time intervals spanning minutes, hours, days, weeks, months, or longer. This accumulation period might be preset, user-selected, or responsive to a start or stop in queue activity.

The periodic collection associated with the queue reports may be preset, user-selected, or dynamic, responding to the volume of queue activity. In one embodiment, the periodic collection of activity information occurs over user-selected time intervals. In another embodiment, during periods of extremely high queue activity, the time interval may be dynamically shortened to better capture statistics and data representative of the queue activity. Alternatively, the periodic collection may occur over a preset time interval.

At block 304, queue data associated with a largest number of messages in the individual queue is identified. For instance, within the queue reports, queue data associated with the queue report having the largest number of messages in the queue can be identified. The identified queue data may include the number of puts operations, the number of gets operations, the maximum number of messages in the individual queue, the average duration of time a message remains in the individual queue, and the number of bytes in the individual queue during a time interval, etc.

Turning now to block 306, a target-queue size is determined based upon the identified queue data associated with the largest number of messages in the individual queue. Any and all of the statistics and data within the identified queue data may be utilized in determining a target-queue size. In one embodiment, determining the target-queue size includes generating an average message size using the identified queue data. The average message size can then be used to calculate a target-queue size.

The determination of a target-queue size may be performed automatically or on command. A target-queue size may be determined for each separate and individual queue operating in the MOM environment. The determination of a target-queue size may be performed periodically, wherein the period is preset or user-selected. In one aspect, a target-queue size of the individual queue may be stored after each determination. Thus, one or more target-queue sizes may be generated for an individual queue. Storage of one or more target-queue sizes may be used to generate a database with sets of target-queue sizes corresponding to each separate and individual queue. These sets may be referenced by various embodiments of the present invention.

Upon identifying a target-queue size for a queue, a parameter of the individual queue can be modified to reflect the target-queue size. In one aspect, upon a stop in queue activity, the actual size of the individual queue is compared to the target-queue size before determining if the individual queue should be modified. In further aspects, it may first be determined that the individual queue may benefit from an adjustment or a user may be notified that a queue may benefit by being adjusted.

Turning to FIG. 4, another exemplary method 400 is depicted for tuning a queue by determining and implementing a target-queue size based on message volume. Initially at block 402, the method 400 includes referencing a plurality of queue data, wherein the queue data corresponds to an individual queue. Queue data may include the number of puts operations, the number of gets operations, the maximum number of messages in the individual queue, the average duration of time a message remains in the individual queue, the number of bytes within the individual queue, etc. Queue data may include additional or alternative statistics or data pertaining to the queue or messages associated therewith.

Each set of queue data referenced further corresponds to a time interval during which the queue activity represented in the statistics occurred. In this way, one of the plurality of queue data sets corresponds to an individual queue and a single time interval. An accumulated pool of queue data sets may exist for each individual queue. The accumulated pool of queue data sets may span minutes, hours, days, weeks, months, or longer. This accumulation period of the plurality of queue data sets of an individual queue might be preset, user-selected, and/or responsive to a start or stop in queue activity or scheduled MOM maintenance.

Turning to block 404, embodiments of the method 400 further comprise locating the queue data set having the highest volume of queue messages. The volume indicates the number of messages being transported through the individual queue, i.e., message depth. Thus, the highest volume will indicate the time interval during which the individual queue had the most message traffic.

At block 406, the method 400 includes generating an average queue message size from the located queue data set having the highest volume of queue messages. An average queue message size may be generated from the located queue data set corresponding to the time interval reporting the highest volume of queue-messages. Within the located queue data set, the number of puts operations and the total bytes in the individual queue are retrieved. The total bytes may be divided by the number of puts operations to calculate the average queue message size (in bytes per put operation)

for the individual queue. An average queue size may be generated for each separate and individual queue in the MOM environment.

At block 408, a target-queue size is determined based on the average queue message size. In this regard, the average queue message size may be multiplied by the highest volume of queue messages (i.e., message depth) within the located queue data set to calculate an amount of storage for accommodating the highest volume of queue-messages. The storage for accommodating the highest volume of queue messages may be converted to kilobytes (kB) when divided by the number 1024 (1024 bytes in 1 kB). This final number represents a target-queue size. A target-queue size is instructive in tuning an individual queue by ratcheting up or down the size of the queue responsible for storing the messages of the individual queue. Further embodiments include storing a target-queue size of the individual queue.

Determining a target-queue size may be done periodically, e.g., every twenty-four hours. Alternatively or in tandem, a target-queue size may be determined on command. In another aspect, a target-queue size may be determined automatically, such as when queue activity ceases, the computing-system architecture 100 or the MOM environment is shut down or restarted, and/or upon other interruptions, including scheduled maintenance. In further embodiments, one or more determined target-queue sizes of the individual queue may be compared to one another. In one aspect, a target-queue size may be determined on command and also compared to the five most recent periodically determined target-queue sizes of the individual queue. Alternatively, the most recent periodically determined target-queue size may be compared to one or more previously determined target-queue sizes, independent of how the previously-determined target-queue sizes were determined.

At block 410, the size of the individual queue is adjusted based upon the determined target-queue size. The size of the individual queue determines the volume of messages the individual queue can hold for transport. The size of the individual queue can be adjusted by ratcheting up or down the size of the queue or buffer responsible for storing the messages of the individual queue. By ratcheting up or down the size of the queue, the individual queue is tuned. Further, by adjusting the individual queue size based upon the target-queue size, tail drop may be reduced and message throughput improved.

Adjusting the size of the individual queue may occur automatically. Additionally, the adjustment may occur automatically upon cessation of queue activity. In other aspects, adjusting the size of the individual queue may occur upon command or in response to a user selection. In this regard, a user may be prompted to allow the adjustment upon shutting down queue activity.

In other aspects, the method 400 further includes comparing the size of the individual queue to the target-queue size and determining if the individual queue should be modified. This comparison may be initiated upon a stop in queue activity. In response to the comparison, in further embodiments, the user may be prompted to allow an automatic adjustment of the individual queues upon the shutdown of the computing-system architecture 100 or the MOM environment. In other aspects, based on the comparison, an adjustment of the individual queue will automatically occur upon cessation of queue activity.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, perform a method comprising:
    referencing a plurality of queue data sets for one queue, wherein each of the plurality of queue data sets corresponds to activity of the one queue in a separate time interval occurring;
    identifying, among the plurality of queue data sets for the one queue, a high-activity queue data set that is associated with a comparatively large number of messages;
    generating an average message size based on the high-activity queue data set, wherein the high-activity queue data set includes a number of puts operations and a number of bytes in the one queue;
    determining a target size for the one queue using the average message size generated from the first queue data set; and
    adjusting the one queue from a current size to the target size.

2. The media of claim 1, further comprising storing the target size of the one queue in a database.

3. The media of claim 1, further comprising, upon a stop in queue activity, determining whether the one queue should be modified based on a comparison of a current size of the one queue to the target size.

4. The media of claim 1, further comprising, upon a stop in queue activity, modifying a parameter of the one queue to reflect the target size.

5. The media of claim 1, wherein determining the target size further comprises generating an average message size based on the queue data associated with the largest number of messages in the one queue.

6. The media of claim 1, wherein determining the target size further comprises generating an average duration of time a message remains in the one queue based on the queue data associated with the largest number of messages in the one queue.

7. The media of claim 1, wherein the queue data associated with the largest number of messages in the one queue includes a total number of puts operations and a total number of bytes.

8. The media of claim 1, wherein adjusting the one queue from a current size to the target size comprises automatically increasing message capacity or automatically decreasing message capacity of the one queue.

9. The media of claim 1, wherein the collection time period is a user-selected time interval.

10. A computer-implemented method for tuning queue size, the method comprising:
    periodically collecting queue activity data for a queue over a predetermined time interval;
    detecting a decrease in queue activity of the queue;
    in response to determining the decrease in queue activity:
        referencing a plurality of queue data sets for the queue, wherein each of the plurality of queue data sets corresponds to activity of the queue in a separate time interval; and identifying, among the plurality of queue data sets for the queue, a high-activity queue data set that is associated with a large number of messages;

generating an average message size based on the high-activity queue data set, wherein the high-activity queue data set includes a number of puts operations and a number of bytes in the queue;

determining a target size for the queue using the average message size generated from the first queue data set; and adjusting the queue from a current size to the target size.

11. The method of claim 10, wherein the average message size is generated further based on more than one high-activity queue data set identified among the plurality of queue data sets for the queue.

12. The method of claim 10, wherein the high-activity queue data set includes an average duration of time a message remains in the one queue.

13. The method of claim 10, wherein the predetermined time interval is dynamically adjusted based on detecting a decrease in queue activity of the queue.

14. The method of claim 10, further comprising detecting an increase in queue activity of the queue.

15. The method of claim 14, wherein the predetermined time interval is dynamically adjusted based on detecting an increase in queue activity of the queue.

16. Non-transitory computer-readable media having computer-executable instructions embodied thereon that, when executed, perform a method of dynamically collecting queue activity data, the method comprising:

periodically collecting queue activity data for a plurality of queues over a predetermined time interval;

determining there is an increase in queue activity;

determining a shortened time interval based on the predetermined time interval and the increase in queue activity;

in response to determining the increase in queue activity, automatically modifying the periodic collection of the queue activity data to reflect the shortened time interval; and storing the periodically collected queue activity data for subsequently tuning the plurality of queues.

17. The media of claim 16, further comprising:

periodically collecting queue activity data for the plurality of queues over the modified time interval;

determining there is a decrease in queue activity;

determining a lengthened time interval based on the predetermined time interval and the increase in queue activity; and in response to determining the decrease in queue activity, automatically modifying the periodic collection of the queue activity data to reflect the lengthened time interval.

18. The media of claim 16, wherein determining there is an increase in queue activity comprises determining a number of messages in a queue of the plurality of queues.

19. The media of claim 16, wherein determining there is an increase in queue activity comprises determining the number of puts operations in a queue of the plurality of queues.

20. The media of claim 16, wherein determining there is an increase in queue activity comprises determining an average duration of time a message remains in a queue of the plurality of queues.

* * * * *